United States Patent
Teoh et al.

(10) Patent No.: US 12,354,365 B2
(45) Date of Patent: Jul. 8, 2025

(54) METHOD AND SYSTEM FOR EMPLOYING VIDEO ANALYTICS IN PROVIDING A SITUATIONAL AWARENESS ALERT

(71) Applicant: MOTOROLA SOLUTIONS, INC., Chicago, IL (US)

(72) Inventors: Wooi Ping Teoh, Georgetown (MY); Wai Mun Lee, Ipoh (MY); Tejeash Duraimanickam, Lunas (MY); Chun Wen Ooi, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 126 days.

(21) Appl. No.: 18/528,995

(22) Filed: Dec. 5, 2023

(65) Prior Publication Data
US 2025/0182489 A1 Jun. 5, 2025

(51) Int. Cl.
*G06V 20/52* (2022.01)
*G06F 3/01* (2006.01)
*G06V 10/74* (2022.01)
*G06V 40/20* (2022.01)

(52) U.S. Cl.
CPC .............. *G06V 20/53* (2022.01); *G06F 3/013* (2013.01); *G06V 10/761* (2022.01); *G06V 40/20* (2022.01)

(58) Field of Classification Search
None
See application file for complete search history.

(56) References Cited

U.S. PATENT DOCUMENTS

| 5,461,390 A | 10/1995 | Hoshen |
| 9,344,616 B2 | 5/2016 | Donovan et al. |
| 10,867,376 B2 * | 12/2020 | Liu ......................... G06T 7/187 |
| 2022/0061775 A1 * | 3/2022 | Jepson ................. A61B 5/7267 |
| 2023/0103588 A1 * | 4/2023 | Somanath ............. G06Q 50/40 |

FOREIGN PATENT DOCUMENTS

IN 364414 B 4/2021

OTHER PUBLICATIONS

CU Denver News, City Stories, "Did you know January is National Stalking Awareness Month?", The Regents of the University of Colorado, Denver, 2022, Jan. 13, 2020, all pages.
Holly Bancroft: "Stalking super-complaint filed against police over 'failure' to protect victims", The Independent, News, UK, Home news, Friday Nov. 25, 2022 10:12GMT, https://www.independent.co.uk/news/uk/home-news/stalking-super-complaint-police-failings-b2232836.html, all pages.

* cited by examiner

*Primary Examiner* — Talha M Nawaz

(57) ABSTRACT

A method and system for employing video analytics in providing a situational awareness alert is disclosed. The method includes automatically detecting that a first person has entered a coverage area of a security camera. The method also includes automatically determining that the first person is registered in a monitoring service associated with the coverage area. The method also includes determining that a plurality of environmental and geospatial parameters associated with the coverage area satisfy a situational awareness threshold applicable to the first person. In response to the situational awareness threshold being satisfied, video analytics is employed to analyze video captured by security camera(s) to determine that there exists a second person having a respective Point Of View (POV) that permits staring observation of the first person by the second person.

20 Claims, 6 Drawing Sheets

METHOD AND SYSTEM FOR EMPLOYING VIDEO ANALYTICS IN PROVIDING A SITUATIONAL AWARENESS ALERT

BACKGROUND

It is not uncommon for a person moving around in public to be followed from time to time. This can happen for one or more of various possible reasons. Sometimes it is an ex-spouse who is not ready to move on. Sometimes it is a person with a mental health issue that may at times become easily enraged and retaliative in relation to seemingly insignificant actions of others. Sometimes it is a mystery admirer who is not so secretive about their unrequited feelings. Whatever the reason, it is important for the person being followed to identify their predicament, and to take appropriate action to mitigate against an associated risk of danger.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
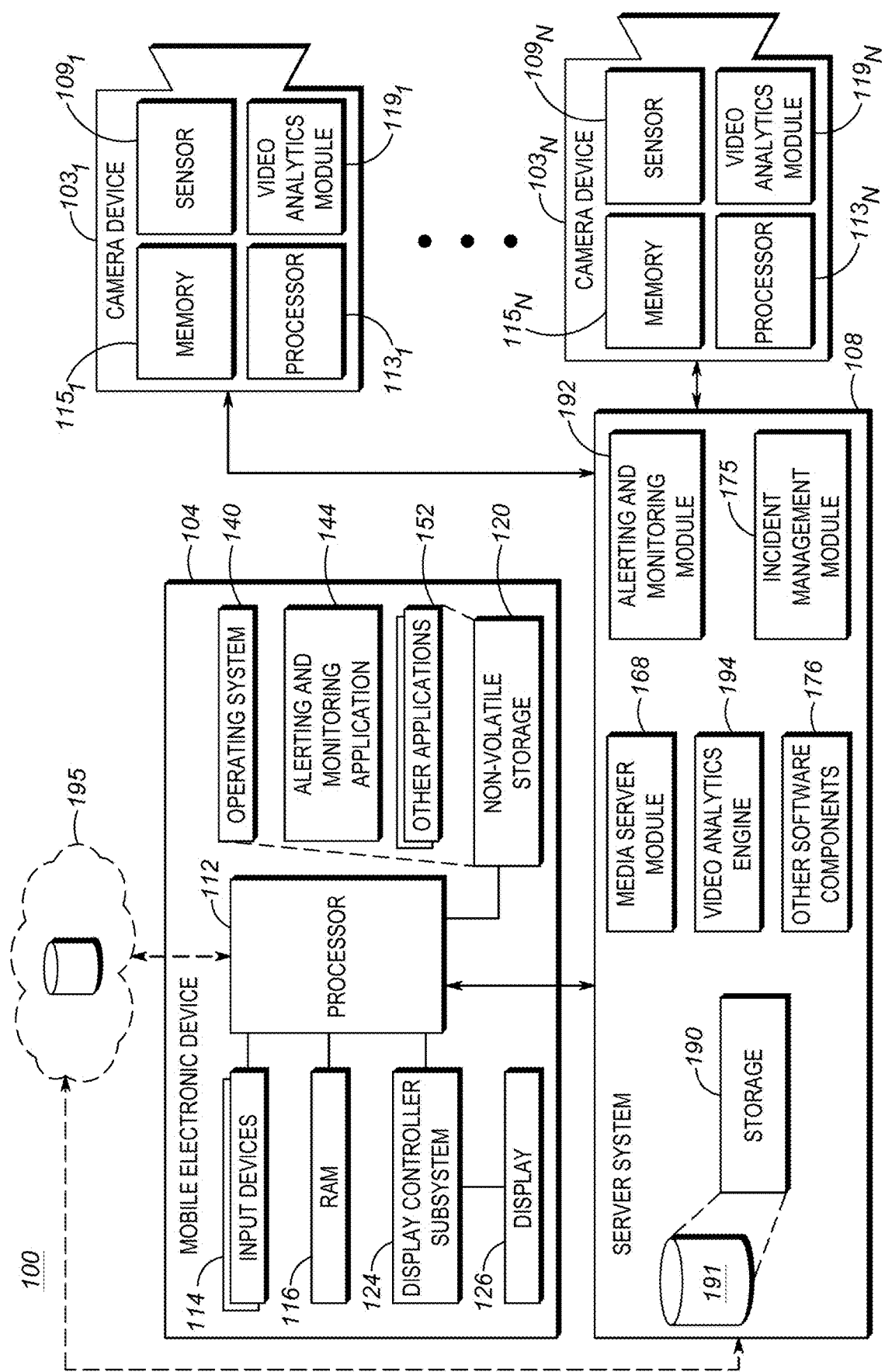
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a method that includes automatically detecting that a first person has entered a coverage area of a security camera. The method also includes automatically determining that the first person is registered in a monitoring service associated with the coverage area. The method also includes determining, using an at least one processor, that a plurality of environmental and geospatial parameters associated with the coverage area satisfy a first situational awareness threshold applicable to the first person. In response to the first situational awareness threshold being satisfied, video analytics is employed to analyze video captured by at least one of the security camera and one or more other security cameras to determine that there exists a second person having a respective Point Of View (POV) that permits staring observation of the first person by the second person. The method also includes monitoring activity of the second person, by operation of the at least one processor communicatively interfacing with at least one of the security camera and the one or more other security cameras. The method also includes generating, using the at least one processor, a security risk score based on an extent to which predetermined threatening activity is present in the monitored activity. The method also includes evaluating whether the security risk score in combination with the environmental and geospatial parameters is sufficient or insufficient for a determination that a second situational awareness threshold is satisfied. When the second situational awareness threshold is satisfied, an alert is responsively sent to either or both of a mobile device of a third person and a mobile device of the first person. The alert provides information in relation to at least the second person.

In accordance with another example embodiment, there is provided a system that includes at least one processor and an at least one electronic storage medium storing program instructions that when executed by the at least one processor cause the at least one processor to perform detecting that a first person has entered a coverage area of a security camera, and determining that the first person is registered in a monitoring service associated with the coverage area. The program instructions upon execution by the at least one processor also cause the at least one processor to perform determining that a plurality of environmental and geospatial parameters associated with the coverage area satisfy a first situational awareness threshold applicable to the first person. In response to the first situational awareness threshold being satisfied, video captured by at least one of the security camera and one or more other security cameras is analyzed to determine that there exists a second person having a respective Point Of View (POV) that permits staring observation of the first person by the second person. The program instructions upon execution by the at least one processor also cause the at least one processor to perform monitoring activity of the second person by communicatively interfacing with at least one of the security camera and the one or more other security cameras. The program instructions upon execution by the at least one processor also cause the at least one processor to perform generating a security risk score based on an extent to which predetermined threatening activity is present in the monitored activity. The program instructions upon execution by the at least one processor also cause the at least one processor to perform evaluating whether the security risk score in combination with the environmental and geospatial parameters is sufficient or insufficient for a determination that a second situational awareness threshold is satisfied. When the second situational awareness threshold is satisfied, an alert is responsively sent to either or both of a mobile device of a third person and a mobile device of the first person. The alert provides information in relation to at least the second person.

Each of the above-mentioned embodiments will be discussed in more detail below, starting with example system and device architectures of the system in which the embodiments may be practiced, followed by an illustration of processing blocks for achieving an improved technical method, device, and system for employing video analytics in providing a situational awareness alert.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The meaning of the term "Point Of View" or "POV" as used herein means a spatial range within which unobstructed vision is afforded to some person positioned at a particular geographic location. Depending on the context, the POV may be further limited by a discernable orientation of the person at the particular geographic location, or alternatively the POV may assume that a person's POV is not limited by the person's orientation.

Further advantages and features consistent with this disclosure will be set forth in the following detailed description, with reference to the figures.

Referring now to the drawings, and in particular FIG. 1 which is a block diagram of an example system 100 within which methods in accordance with example embodiments can be carried out. Included within the illustrated system 100 are one or more mobile electronic devices 104 and a server system 108. The mobile electronic device 104 may be a handheld device such as, for example, a tablet, a phablet, a two-way radio, a smart phone or a personal digital assistant (PDA); a laptop computer; a smart television; or any other suitable electronic device that a person can carry around with them. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the mobile electronic device 104 rather than within the server system 108.

The mobile electronic device 104 communicates with the server system 108 through one or more networks. These networks can include the Internet, or one or more other public/private networks coupled together by network switches or other communication elements. As an example and not by way of limitation, the mobile electronic device 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the mobile electronic device 104 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these.

The mobile electronic device 104 includes at least one processor 112 that controls the overall operation of the mobile electronic device. The processor 112 interacts with various subsystems such as, for example, input devices 114 (such as a selected one or more of a keyboard, mouse, scanner, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126.

Still with reference to the mobile electronic device 104 of the system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the mobile electronic device 104 is turned off. Regarding the operating system 140, this includes software that manages computer hardware and software resources of the mobile electronic device 104 and provides common services for computer programs. Also, those skilled in the art will appreciate that the operating system 140, alerting and monitoring application 144, and other applications 152, or parts thereof, may be temporarily loaded into a volatile store such as the RAM 116. The processor 112, in addition to its operating system functions, can enable execution of the various software applications on the mobile electronic device 104.

Regarding the alerting and monitoring application 144, this can be run on the mobile electronic device 104 and includes functionality to allow a user of the mobile electronic device 104 to carry out one or more of the following: input information into (and review information in) an electronic calendar that impacts an extent to which a monitoring service will operate on specific date(s)/time(s), review one or more person populated maps to which a monitoring service may apply, receive and respond to monitoring alerts, access and package device location information generated within the mobile electronic device 104, and input and adjust settings of the alerting and monitoring application 144.

Still with reference to FIG. 1, the server system 108 includes several software components for carrying out other functions of the server system 108. For example, the server system 108 includes a media server module 168. The media server module 168 handles requests within the system 100 related to storage and retrieval of security video taken by camera devices 103$_1$-103$_n$. The server system 108 also includes a video analytics engine 194. The video analytics engine 194 can, in some examples, be any suitable one of known commercially available software that carry out computer vision related functions (complementary to any video analytics performed in the security cameras) as understood by a person of skill in the art. Other suitable implementation alternatives, apparent to those skilled in the art, are also contemplated.

The server system 108 also includes an incident management module 175 which may facilitate, for example, police officers, security personnel, and the like to be able to document and review incidents that such employed people are tasked with responding to. The server system 108 also includes an alerting and monitoring module 192. The alerting and monitoring module 192 provides server-side functionality complementary to the functionality provided by the alerting and monitoring application 144 including, for example, the generation and delivery of monitoring alerts, interfacing with data store 190, etc. The server system 108 also includes a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded security video, other sensor data, etc. in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc. The one or more databases 191 may also contain records of subscribers to the herein described monitoring service in order to, for example, facilitate a subscriber in being authenticated in connection with accessing and receiving the monitoring service. The one or more databases 191 may also contain records and data relevant to the incident management module 175.

Optionally, the system 100 may include connections to the illustrated one or more cloud services 195. For example, the mobile electronic device 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). The cloud service(s) 195 which may, amongst other things, include neural network(s), and may include functionality similar and/or complementary to functionality provided by the server system 108.

The illustrated system 100 includes a plurality of camera devices 103$_1$-103$_n$ (hereinafter interchangeably referred to as "cameras 103$_1$-103$_n$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the system 100 includes any suitable number of cameras (i.e. n is any suitable integer greater than one).

The camera 103 includes an image sensor 109 (corresponding to one of the sensors 109$_1$-109$_N$ shown in FIG. 1) for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a drone device, a vehicle, a security panel, etc.

The camera 103 includes one or more processors 113 (corresponding to one of the processors 113$_1$-113$_N$ shown in FIG. 1), one or more video analytics modules 119 (corresponding to one of the video analytics modules 119$_1$-119$_N$ shown in FIG. 1), and one or more memory devices 115 (corresponding to one of the memories 115$_1$-115$_N$ shown in FIG. 1) coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Although the system 100 illustrated in FIG. 1 only explicitly shows video sensor devices coupled to the server system 108, it will be understood that the system 100 is not limited in contemplated compositions to just video sensor devices. Some examples of the system 100 include a heterogeneous mixture of both video sensor devices and non-video sensor devices (for example, radar-based devices) coupled to the server system 108.

Figure 2:
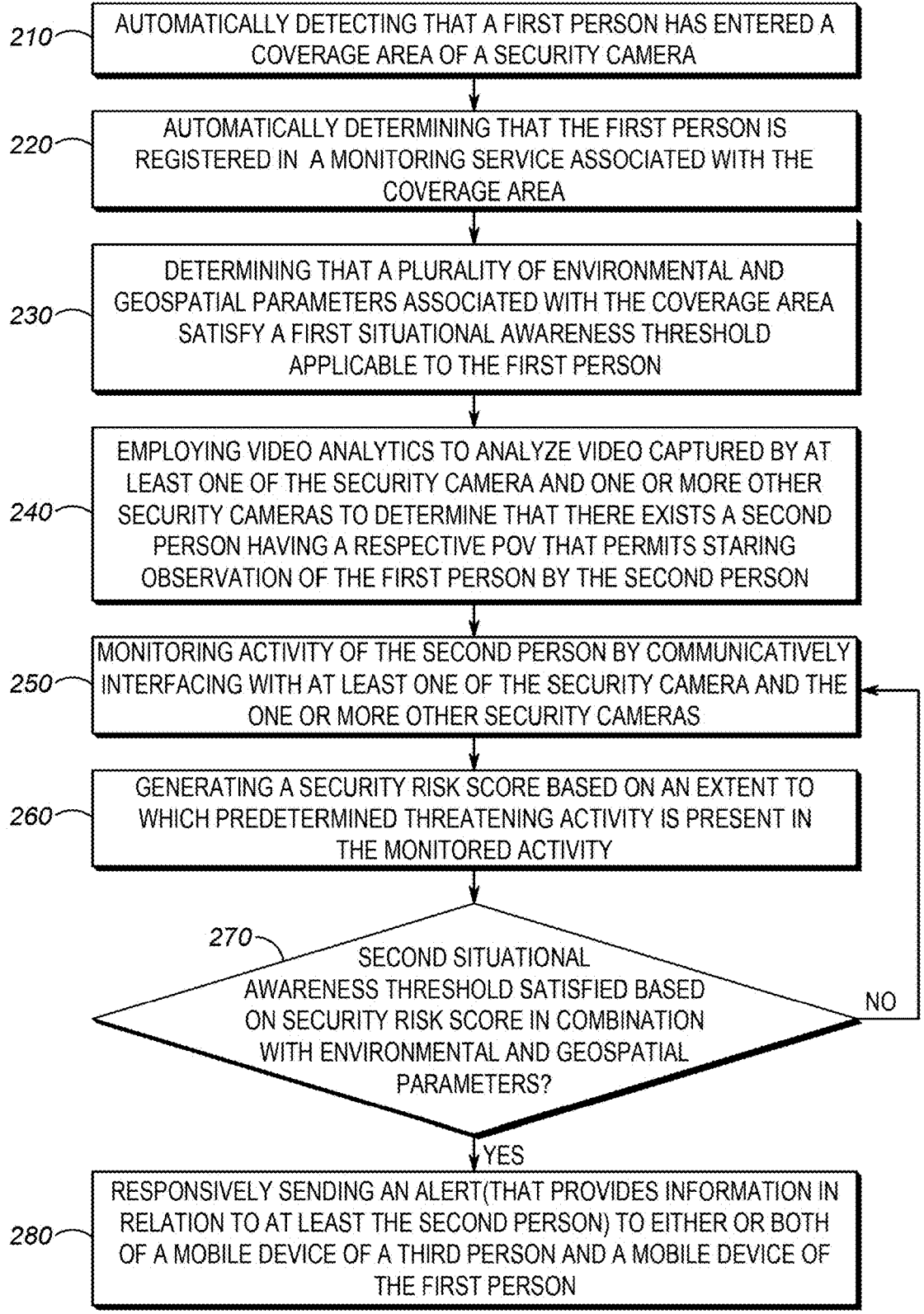
FIG. 2 is a flow chart illustrating a computer-implemented method in accordance with an example embodiment.

Reference is made to FIG. 2. FIG. 2 is a flow chart illustrating a method 200 in accordance with an example embodiment.

Firstly in the method 200 of FIG. 2, a first person is automatically detected (210) as having entered a coverage area of a security camera. The security camera may be, for example, the camera 103 described previously in relation to FIG. 1.

Next in the method 200, the first person is automatically determined (220) to be registered in a monitoring service associated with the coverage area. For instance, the server system 108 may receive and authenticate login credentials transmitted thereto by the mobile electronic device 104.

Next in the method 200, an at least one processor determines (230) that a plurality of environmental and geospatial parameters associated with the coverage area satisfy a first situational awareness threshold applicable to the first person. Examples of environmental and geospatial parameters include the following: crowd density data, time frame data, past incident data, and environmental condition data. In some examples, a mobile application activation command may be optionally sent to the mobile electronic device 104 of the first person (i.e. sent in response to a determination that the first situational awareness threshold has been satisfied).

It will be noted that various contexts for receiving situational awareness update(s) are contemplated. For example, situational awareness updates may be transmitted to the mobile electronic device 104 of the first person in accordance with a pre-programmed electronic calendar corresponding to the first person. As another example, that the first person is in a roaming location may be automatically detected and, in response thereto, at least one situational awareness update reflective of the roaming location may be transmitted (for example, transmitted to the mobile device of the first person).

Next in the method 200, in response to the first situational awareness threshold being satisfied, video analytics is employed (240) to analyze video captured by at least one of the security camera and one or more other security cameras to determine that there exists a second person having a respective Point Of View (POV) that permits staring observation of the first person by the second person. For example, one or more of the video analytics module 119 (FIG. 1) and the video analytics engine 194 (FIG. 1) may enable the above-mentioned video analytics to be carried out.

Figure 3:
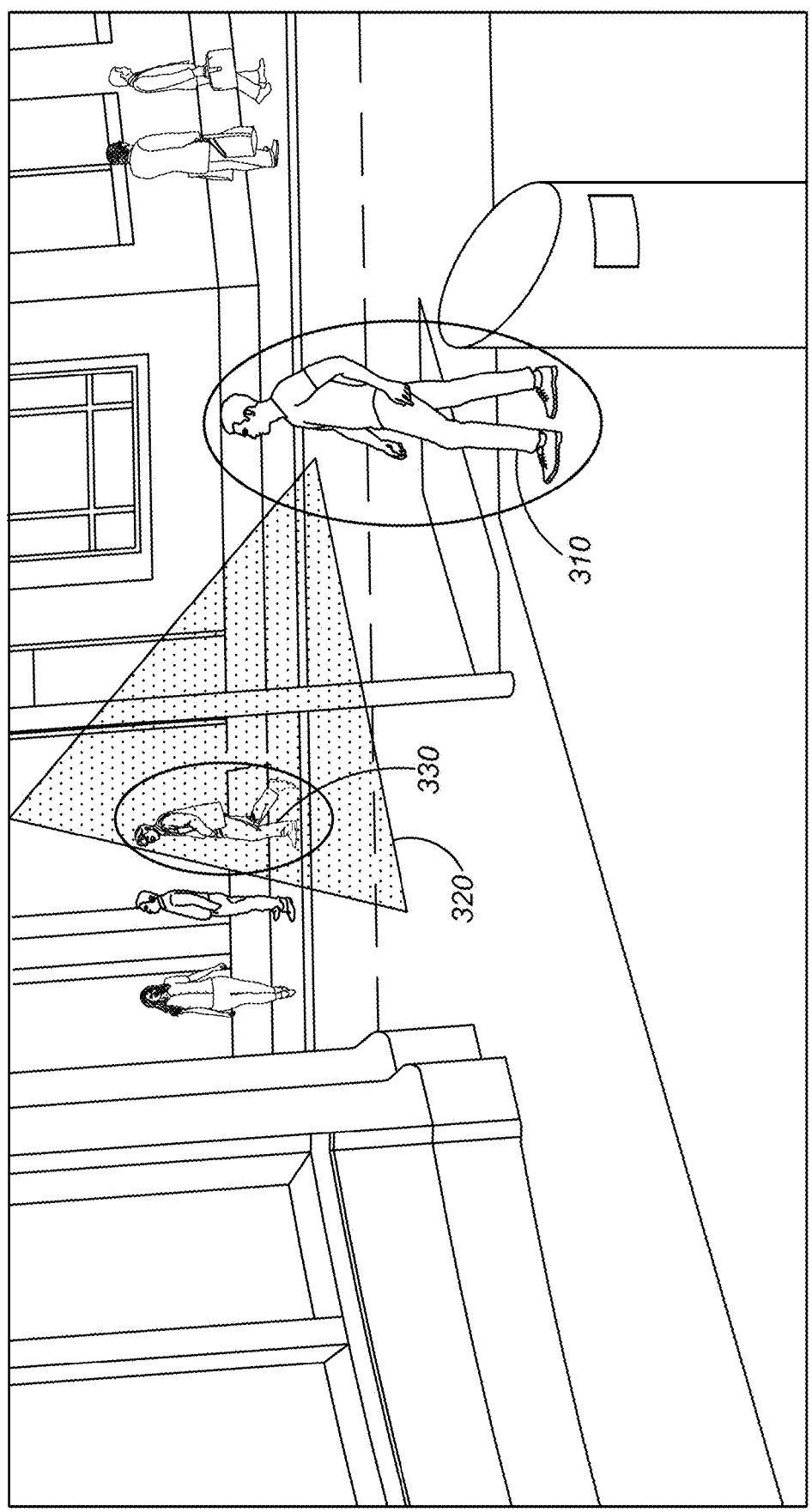
FIG. 3 is a diagram providing additional example detail in relation to the computer-implemented method of FIG. 2.

FIG. 3 is a diagram providing additional example detail regarding the above-mentioned part of the method 200. In FIG. 3, the above-mentioned "second person" is shown as person 310 having a corresponding POV 320. Also the "first person" is shown as person 330. Additionally, as clearly shown in FIG. 3, the POV 320 is such that the person 330 falls in the vision range of the person 310. Thus, putting it another way, the relative positions of the person 310 and the person 330 facilitate the person 310 to prolongedly observe the person 330. Video analytics may be provided to analyze captured security camera video to intelligently recognize that this is occurring (for example, referring to FIG. 1, the video analytics engine 194 and/or the video analytics module 119 may be configured for delivering this video analytics).

Figure 4:
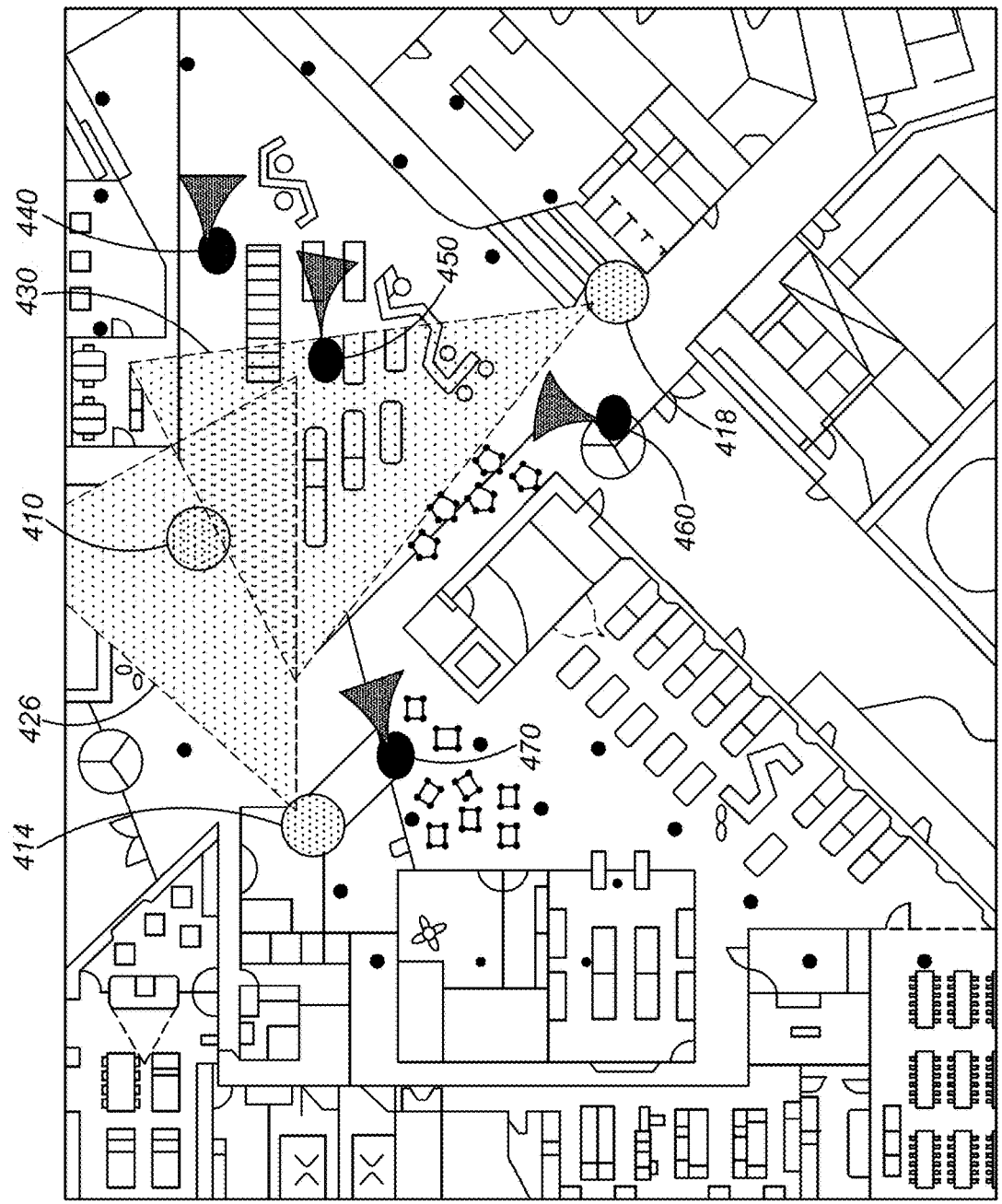
FIG. 4 is a diagram of an example people movement map, over a first time interval, in accordance with at least one example embodiment.
Figure 5:
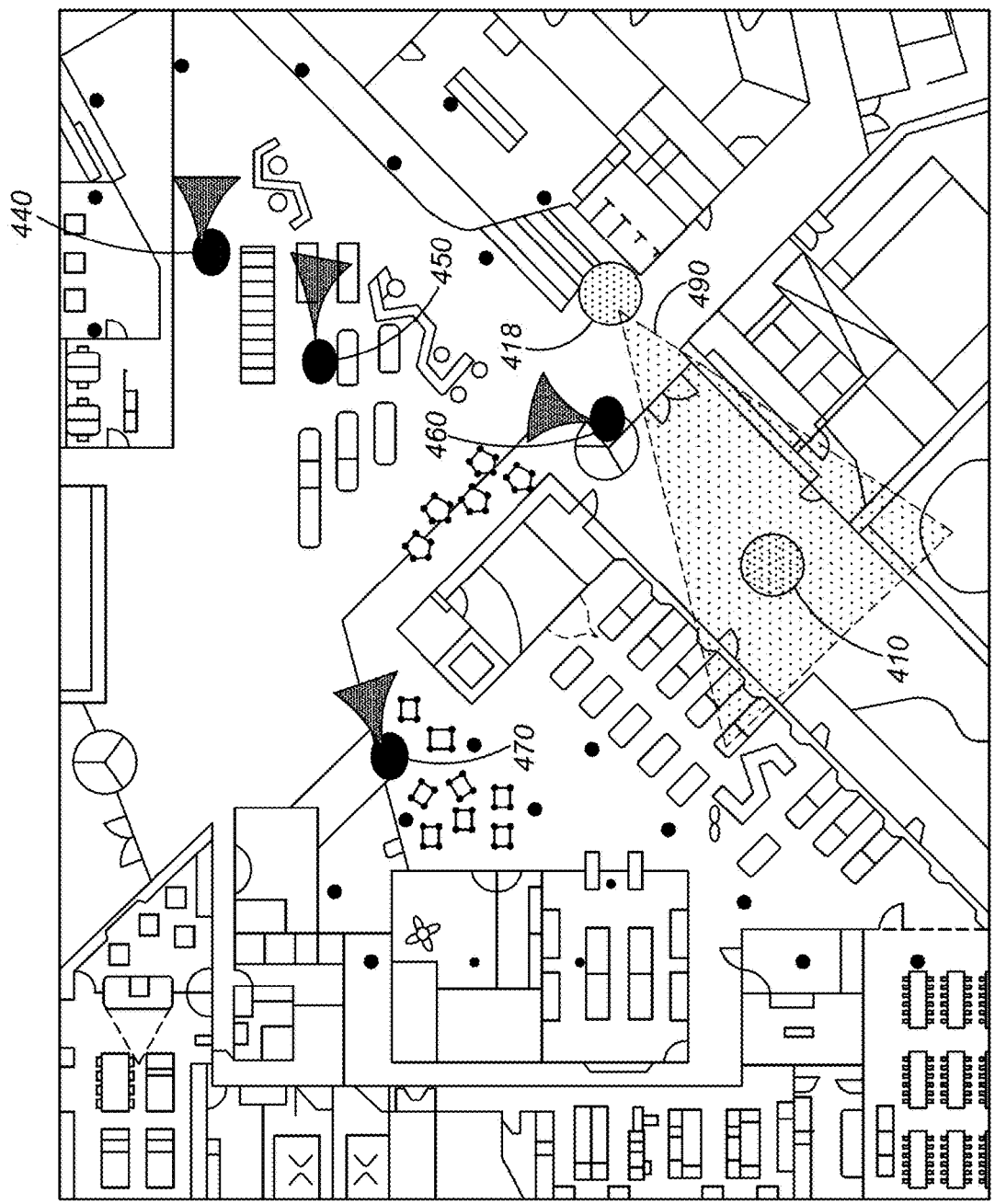
FIG. 5 is a diagram of the people movement map of FIG. 4, over a second time interval later than the first time interval.

Next in the method 200, activity of the second person is monitored (250) through operation an at least one processor communicatively interfacing with at least one of the security camera and the one or more other security cameras. Taking FIG. 1 as an example, one, some or all of the camera devices $103_1$-$103_n$. may be operated to monitor the second person (as mentioned, the second person may be, for instance, the person 310 shown in FIG. 3). In some examples, the alerting and monitoring application 144 may generate (for instance, generate on the display screen 126) a people movement map. FIGS. 4 and 5 shows an example of a people movement map 400 over different first and second time intervals. In FIG. 4, ellipse 410 is shown to represent a "first person" illustrated in respect of some first time interval (for example, 20 minutes, 30 minutes, or any suitable time duration) on the people movement map 400. Also, regarding two circles 414 and 418, these are shown to represent two potential "second persons" in relation to the first time interval. POVs 426 and 430 correspond to the circles 414 and 418 respectively. The ellipse 410 is within both of the POVs 426 and 430. Thus, over the first time interval, the two potential second persons have maintained a clear visual range of the first person. Next in FIG. 5, which corresponds to a second later time interval, only the circle 418, with corresponding POV 490, remains (the circle 414 has disappeared). Thus in the illustrated example the second potential "second person" is determined to be a potential stalker of the first person (whereas the first potential "second person" is not the potential stalker). It will be also noted that other circles 440, 450, 460 and 470 in both FIGS. 4 and 5 correspond to locations of other people who have been detected on security cameras (but not identified as posing any potential risk to the first person).

Next in the method 200, a security risk score is generated (260) based on an extent to which predetermined threatening activity is present in the monitored activity. For example, one or more processors within the system 100 may be configured to execute program instructions to perform the action 260. Also, regarding examples of predetermined threatening activity contemplated as impacting the risk score, these include the following: i) the second person tailing the first person; and ii) the second person remaining within a predetermined distance of the first person. Also, those skilled in the art will appreciate that timer(s) can be used to confirm that a type of activity has occurred (for example, an activity of remaining too close to a person might not be confirmed until the second person stays within some predetermined distance of the first person beyond a some specific time duration to which a timer is set).

Other examples of predetermined threatening activity contemplated as impacting the risk score include: i) unusual gazing by the second person at a mobile device carried by the second person; and ii) the second person exhibiting movement patterns consistent with stealthy surveillance of the first person by the second person; and iii) a threatening pattern in walking pace change recognized by the video analytics module 119, the video analytics engine 194, or some combination of both. Regarding iii) this may involve, for instance, first calculating an initial walking pace of the second person then, once the first person moves out of the second person POV (for example, the first person might move beyond visual line of sight of the second person by turning ninety degrees at a building corner so as to become hidden by the building) immediately thereafter the video analytics module and/or engine detects responsively abnormal change(s) with respect to the monitored aspect of second person POV (for instance, the walking pace of second person suddenly increases in an attempt in regaining the previous state of the second person POV that supported surveillance).

Next in the method 200 is decision action 270, where it is evaluated whether the security risk score in combination with the environmental and geospatial parameters are sufficient or insufficient for a determination that a second situational awareness threshold is satisfied. If "YES" (i.e. the second situational awareness threshold is satisfied) an alert is responsively sent (280) to either or both of a mobile device of a third person (who may be, for example, a police officer or a security agent) and a mobile device of the first person (where the alert provides information in relation to at least the second person). If "NO", the actions 250 and 260 are repeated. In some examples of the action 280, the alert is sent, without prior mobile user interaction, to the mobile device of the first person (and/or the third person).

Figure 6:
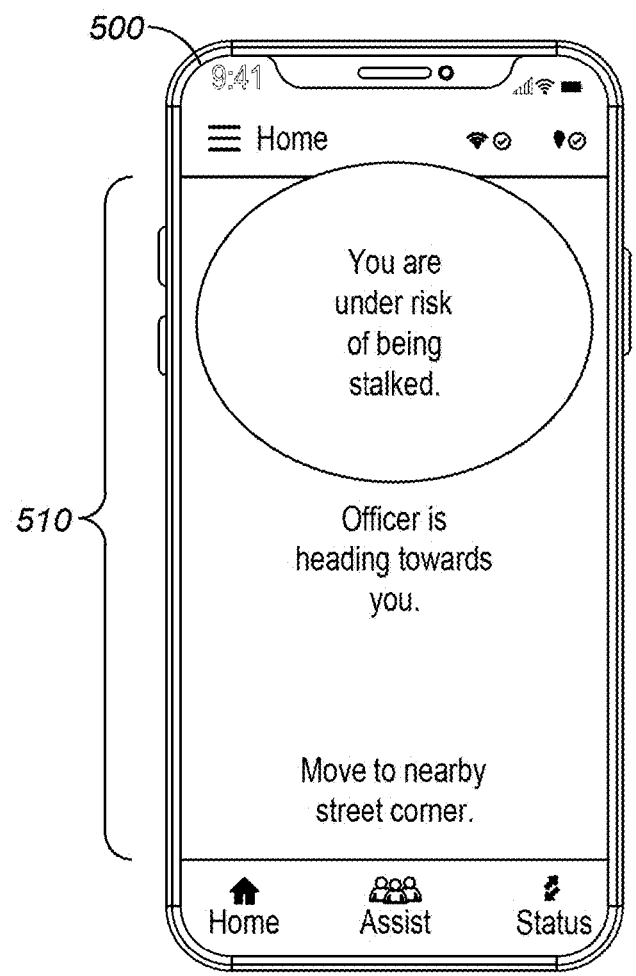
FIG. 6 is a diagram of an example mobile electronics device displaying an example alert in accordance with at least one example embodiment.

FIG. 6 is a diagram of a mobile electronics device 500 (which is a specific example of the previously described mobile electronic device 104). The illustrated mobile electronics device 500 is displaying an alert 510 (the alert 510 is an example of the aforementioned alert delivered to the first person). The alert 510 includes the following text: "You are under risk of being stalked. Officer is heading towards you. Move to nearby street corner." Regarding the last sentence in the alert 510, this is an example of location information for a safe zone. (It will be appreciated that a safe zone is not necessarily a street corner. Other types of safe zones, which may be described in an alert, are contemplate.)

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot employ video analytics to analyze video captured by one or more security cameras, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   automatically detecting that a first person has entered a coverage area of a security camera;
   automatically determining that the first person is registered in a monitoring service associated with the coverage area;
   determining, using an at least one processor, that a plurality of environmental and geospatial parameters associated with the coverage area satisfy a first situational awareness threshold applicable to the first person;
   in response to the first situational awareness threshold being satisfied, employing video analytics to analyze video captured by at least one of the security camera and one or more other security cameras to determine that there exists a second person having a respective Point Of View (POV) that permits staring observation of the first person by the second person;
   monitoring activity of the second person, by operation of the at least one processor communicatively interfacing with at least one of the security camera and the one or more other security cameras;
   generating, using the at least one processor, a security risk score based on an extent to which predetermined threatening activity is present in the monitored activity;
   evaluating whether the security risk score in combination with the environmental and geospatial parameters is sufficient or insufficient for a determination that a second situational awareness threshold is satisfied; and
   when the second situational awareness threshold is satisfied, responsively sending an alert to either or both of a mobile device of a third person and a mobile device of the first person,
   wherein the alert provides information in relation to at least the second person.

2. The method of claim 1 wherein the alert is sent to the mobile device of the first person, and the information of the alert includes location information for a safe zone.

3. The method of claim 1 wherein the environmental and geospatial parameters include at least crowd density data, time frame data, past incident data and environmental condition data.

4. The method of claim 1 wherein the predetermined threatening activity includes at least one of: i) the second person tailing the first person; and ii) the second person remaining within a predetermined distance of the first person.

5. The method of claim 1 wherein the alert is sent, without prior mobile user interaction, to the mobile device of the first person.

6. The method of claim 1 further comprising transmitting a mobile application activation command to the mobile device of the first person in response to a determination that the first situational awareness threshold is satisfied.

7. The method of claim 1 further comprising transmitting situational awareness updates to the mobile device of the first person in accordance with a pre-programmed electronic calendar corresponding to the first person.

8. The method of claim 1 further comprising automatically detecting that the first person is in a roaming location and, in response thereto, transmitting at least one situational awareness update reflective of the roaming location.

9. The method of claim 1 wherein the predetermined threatening activity includes at least one of: i) unusual gazing by the second person at another mobile device that is carried by the second person; and ii) the second person exhibiting movement patterns consistent with stealthy surveillance of the first person by the second person.

10. The method of claim 1 wherein the third person is a police officer or a security agent.

11. A system comprising:
    at least one processor; and
    at least one electronic storage medium storing program instructions that when executed by the at least one processor cause the at least one processor to perform:
    detecting that a first person has entered a coverage area of a security camera;
    determining that the first person is registered in a monitoring service associated with the coverage area;
    determining that a plurality of environmental and geospatial parameters associated with the coverage area satisfy a first situational awareness threshold applicable to the first person;
    in response to the first situational awareness threshold being satisfied, analyzing video captured by at least one of the security camera and one or more other security cameras to determine that there exists a second person having a respective Point Of View (POV) that permits staring observation of the first person by the second person;
    monitoring activity of the second person by communicatively interfacing with at least one of the security camera and the one or more other security cameras;
    generating a security risk score based on an extent to which predetermined threatening activity is present in the monitored activity;
    evaluating whether the security risk score in combination with the environmental and geospatial parameters is sufficient or insufficient for a determination that a second situational awareness threshold is satisfied; and
    when the second situational awareness threshold is satisfied, responsively sending an alert to either or both of a mobile device of a third person and a mobile device of the first person,
    wherein the alert provides information in relation to at least the second person.

12. The system of claim 11 wherein the alert is sent to the mobile device of the first person, and the information of the alert includes location information for a safe zone.

13. The system of claim 11 wherein the environmental and geospatial parameters include at least crowd density data, time frame data, past incident data and environmental condition data.

14. The system of claim 11 wherein the predetermined threatening activity includes at least one of: i) the second person tailing the first person; and ii) the second person remaining within a predetermined distance of the first person.

15. The system of claim 11 wherein the alert is sent, without prior mobile user interaction, to the mobile device of the first person.

16. The system of claim 11 wherein executing of the program instructions by the at least one processor further causes transmitting a mobile application activation command to the mobile device of the first person in response to a determination that the first situational awareness threshold is satisfied.

17. The system of claim 11 wherein executing of the program instructions by the at least one processor further causes transmitting situational awareness updates to the mobile device of the first person in accordance with a pre-programmed electronic calendar corresponding to the first person.

18. The system of claim 11 wherein executing of the program instructions by the at least one processor further causes detecting that the first person is in a roaming location and, in response thereto, transmitting at least one situational awareness update reflective of the roaming location.

19. The system of claim 11 wherein the predetermined threatening activity includes at least one of: i) unusual gazing by the second person at another mobile device that is carried by the second person; and ii) the second person exhibiting movement patterns consistent with stealthy surveillance of the first person by the second person.

20. The system of claim 11 wherein the third person is a police officer or a security agent.

* * * * *